United States Patent
Kettley et al.

(10) Patent No.: US 9,110,801 B2
(45) Date of Patent: Aug. 18, 2015

(54) RESOURCE INTEGRITY DURING PARTIAL BACKOUT OF APPLICATION UPDATES

(75) Inventors: Paul Kettley, Hampshire (GB); Ian James Mitchell, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1224 days.

(21) Appl. No.: 12/368,449

(22) Filed: Feb. 10, 2009

(65) Prior Publication Data
US 2010/0205478 A1    Aug. 12, 2010

(51) Int. Cl.
*G06F 11/00* (2006.01)
*G06F 11/07* (2006.01)

(52) U.S. Cl.
CPC ........ *G06F 11/0793* (2013.01); *G06F 11/0706* (2013.01); *G06F 11/0748* (2013.01)

(58) Field of Classification Search
USPC .......................................................... 714/19
See application file for complete search history.

(56) References Cited

U.S. PATENT DOCUMENTS

| 7,346,905 B2 | 3/2008 | Dorrance et al. |
| 2004/0215998 A1 | 10/2004 | Buxton et al. |
| 2004/0255298 A1* | 12/2004 | Dorrance et al. ............. 718/101 |
| 2006/0253502 A1 | 11/2006 | Raman et al. |
| 2008/0270703 A1* | 10/2008 | Henrion et al. ............... 711/128 |

FOREIGN PATENT DOCUMENTS

| EP | 1868319 A1 | 12/2007 |
| EP | 1873643 A1 | 1/2008 |

* cited by examiner

*Primary Examiner* — Sarai Butler
(74) *Attorney, Agent, or Firm* — Lee Law, PLLC; Christopher B. Lee (57) ABSTRACT

At least one physically inconsistent system resource is identified in response to a failure of an application, where the physically inconsistent system resource was left in a physically inconsistent state as a result of the failure of the application. Available backout operations for any system resources updated by the failed application other than the physically inconsistent system resource are ignored. An automated partial backout of the physically inconsistent system resource is performed. This abstract is not to be considered limiting, since other embodiments may deviate from the features described in this abstract.

25 Claims, 4 Drawing Sheets

RESOURCE INTEGRITY DURING PARTIAL BACKOUT OF APPLICATION UPDATES

BACKGROUND OF THE INVENTION

1. Field of the Invention

The present invention relates to systems and methods for partial backout of application updates. More particularly, the present invention relates to resource integrity during partial backout of application updates.

2. Related Art

Applications that run for long periods of time may fail before completing all desired processing. Applications use system software to update numerous recoverable resources and write associated recovery log records to document the updates that have been performed on the resources. The log records are stored within application log queues. For applications that have run for extended periods of time, many log records may have been generated and stored within the log queues at a time of failure of an application.

When an application failure or an application hosting system failure occurs, the log records are available within the log queues to reconstruct application states at the time of failure. The hosting system has the responsibility of performing recovery operations (e.g., rollback, backout) related to the failed application. Backout refers to a process of processing log records to identify application processing sequences and performing the represented operations to recover the resources.

However, the log records may be stored on different log media, including disks and tapes. Traversing this media is time consuming. Accordingly, for applications that have run for extended periods of time, processing the log records to reconstruct the state of the recoverable resources may take days or weeks to reconstruct the state of these resources.

BRIEF SUMMARY OF THE INVENTION

The subject matter described herein provides automated resource integrity during partial backout of application updates. In response to a failure of an application, system resources that have been left in a physically inconsistent state by the application failure are identified. Available backout operations for physically consistent system resources are ignored to expedite system recovery and restart performance. An automated partial backout is performed on any physically inconsistent system resources to bring the physically inconsistent system resources to a physically consistent state. Available backout operations for the identified physically inconsistent system resources after the physically consistent state is achieved may be ignored to further expedite system recovery and restart performance. System resources that have been partially backed out may be marked during the partial backout process and verified upon system restart.

A method includes identifying, in response to failure of an application, at least one physically inconsistent system resource that was left in a physically inconsistent state as a result of the failure of the application from a plurality of system resources updated by the failed application; ignoring available backout operations for any of the plurality of system resources updated by the failed application other than the at least one physically inconsistent system resource; and performing an automated partial backout of the at least one physically inconsistent system resource.

A system includes a memory adapted to store resource recovery information; and a processor programmed to: identify, in response to failure of an application, at least one physically inconsistent system resource that was left in a physically inconsistent state as a result of the failure of the application from a plurality of system resources updated by the failed application based upon the stored resource recovery information; ignore available backout operations for any of the plurality of system resources updated by the failed application other than the at least one physically inconsistent system resource; and perform an automated partial backout of the at least one physically inconsistent system resource.

An alternative system includes a memory adapted to store recovery log records for a plurality of system resources; and a processor programmed to: retrieve, in response to failure of an application, the recovery log records from the memory; identify at least one physically inconsistent system resource that was left in a physically inconsistent state as a result of the failure of the application from the plurality of system resources updated by the failed application based upon the retrieved recovery log records; ignore available backout operations for any of the plurality of system resources updated by the failed application other than the at least one physically inconsistent system resource; perform an automated partial backout of the at least one physically inconsistent system resource by performing available updates to the at least one physically inconsistent system resource referenced by the retrieved recovery log records as previously initiated by the failed application to bring the at least one system physically inconsistent system resource to a physically consistent state; ignore available updates referenced by the retrieved recovery log records associated with the at least one physically inconsistent system resource after the physically consistent state is achieved; mark the at least one partially backed out system resource for verification; verify physical integrity of the at least one partially backed out system resource prior to restart of the at least one partially backed out system resource; and restart at least one of the application and the plurality of system resources.

A computer program product includes a computer useable storage medium including a computer readable program. The computer readable program when executed on a computer causes the computer to identify, in response to failure of an application, at least one physically inconsistent system resource that was left in a physically inconsistent state as a result of the failure of the application from a plurality of system resources updated by the failed application based upon the stored resource recovery information; ignore available backout operations for any of the plurality of system resources updated by the failed application other than the at least one physically inconsistent system resource; and perform an automated partial backout of the at least one physically inconsistent system resource.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated resource integrity during partial backout of application updates. In response to a failure of an application, system resources that have been left in a physically inconsistent state by the application failure are identified. Available backout operations for physically consistent system resources are ignored to expedite system recovery and restart performance. An automated partial backout is performed on any physically inconsistent system resources to bring the physically inconsistent system resources to a physically consistent state. Available backout operations for the identified physically inconsistent system resources after the physically consistent state is achieved may be ignored to further expedite system recovery and restart performance. System resources that have been partially backed out may be marked during the partial backout process and verified upon system restart.

For purposes of the present subject matter the terms "physical consistency" and "physically consistent" refer to system resources that are functional from a data or component indexing and accessing perspective. For example, if a system resource is physically consistent, memory index operators, memory index operations associated with the system resource, storage locations referenced by the system resource, configuration register values, and peripheral components associated with the system resource may be properly resolved and functional. In contrast, the terms "physical inconsistency" and "physically inconsistent" refer to system resources that are not fully functional from a data or component indexing and accessing perspective. For example, if a system resource is physically inconsistent, at least one memory index operator, memory index operation associated with the system resource, storage location referenced by the system resource, configuration register value, or peripheral component associated with the system resource may not be properly resolved and functional.

The automated resource integrity during partial backout of application updates described herein may be performed in real time to allow prompt system restart after application failures. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

Figure 1:
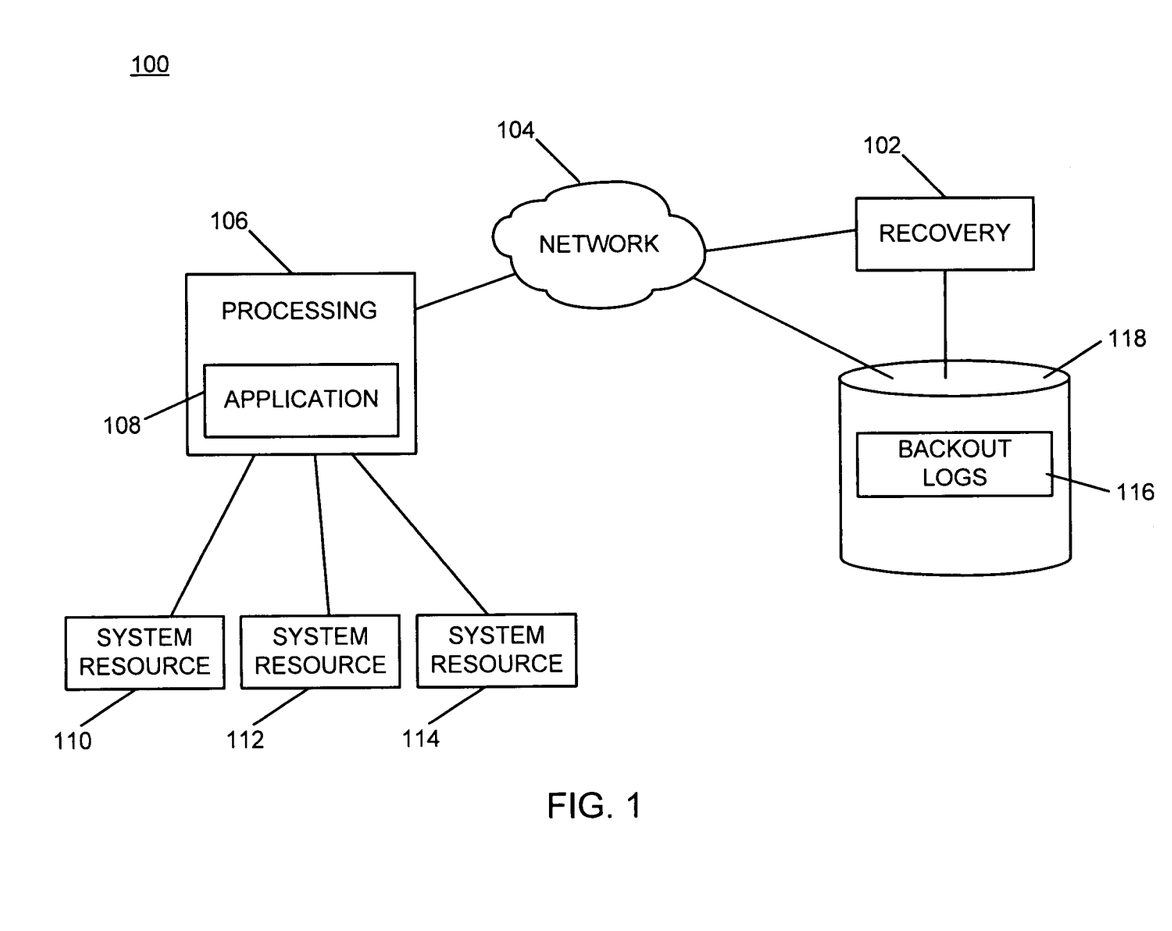
FIG. 1 is a block diagram of an example of an implementation of a system for automated resource integrity during partial backout of application updates according to an embodiment of the present subject matter.

FIG. 1 is a block diagram of an example of an implementation of a system 100 for automated resource integrity during partial backout of application updates. Within the system 100, a recovery device 102 communicates via a network 104 with a processing device 106. The processing device 106 is understood to include at least one processing application 108 that interacts with and updates a system resource_1 110, a system resource_2 112, up to a system resource_N 114. The processing device 106 writes recovery log records to a recovery log record storage area 116 within a database 118 on behalf of the one or more processing applications upon update of any of the system resource_1 110 through the system resource_N 114. It should be understood that the recovery log record storage area 116 may be formed as a queue, table, or other storage suitable arrangement for archival and retrieval of recovery log records.

As a preliminary matter, it should be understood that the example block diagram shown within the system 100 is but one example of components and modules within which the present subject matter may implemented. The example block diagram of the system 100 is shown for ease of illustration purposes and many other alternatives are possible. For example, there is no requirement for the network 104 within a given implementation of the present subject matter. As such, the respective devices may be included within a single device or may be directly interconnected or otherwise communicate without the network 104. Additionally, the recovery device 102 may be integrated into the processing device 106. As well, the processing device 106 may include more than one application 108 that operate upon the system resource_1 110 through the system resource_N 114. An additional network may be implemented for communication between the processing device 106 and the system resource_1 110 through the system resource_N 114 or the network 104 may provide communication capabilities for the respective devices. Furthermore, many processing devices, such as the processing device 106, may be present within a given implementation. In such an implementation, the multiple processing devices may be operated upon by a single recovery device, such as the recovery device 102, or the recovery device 102 may be distributed in association with each of the multiple processing devices to distribute application recovery processing. Many additional variations are possible and all are considered within the scope of the present subject matter.

Regarding the database 118, many possibilities exist for storage of log records. A formal centralized or distributed database infrastructure may be implemented. Additionally, disk storage, tape storage, or any other available storage medium may be used to store the recovery log records within the recovery log record storage area 116. Accordingly, any suitable storage medium or technique is considered within the scope of the present subject matter.

As will be described in more detail below in association with FIGS. 2 through 4, the recovery device 102 provides automated resource integrity during partial backout of application updates based upon determinations of physical consistency and physical inconsistency of the system resource_1 110 through the system resource_N 114. The automated recovery processing performed by the recovery device 102 may be performed in response to a failure of the application 108 within the processing device 106.

The recovery device 102 may be a single computing device or a distributed computing device, as described above. Additionally, the recovery device 102 may be a portable computing device without departure from the scope of the present subject matter. It should also be noted that the recovery device 102 may be any computing device capable of processing information as described above and in more detail below. For example, the recovery device 102 may include devices such as a personal computer (e.g., desktop, laptop, palm, server, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, or any other interconnection mechanism capable of interconnecting the devices.

Figure 2:
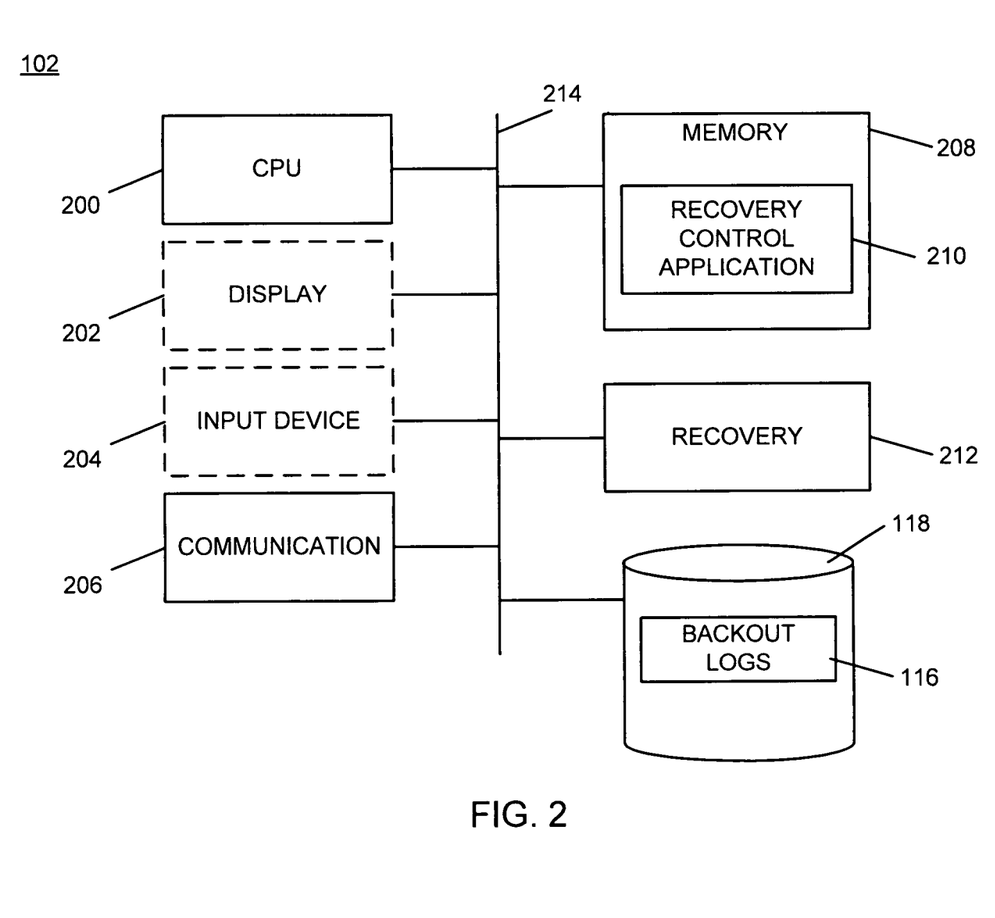
FIG. 2 is a block diagram of an example of an implementation of a recovery device that is capable of performing automated resource integrity during partial backout of application updates based upon recovery log information according to an embodiment of the present subject matter.

FIG. 2 is a block diagram of an example of an implementation of the recovery device 102 that is capable of performing automated resource integrity during partial backout of application updates based upon recovery log information stored in response to application updates of system resources, such as the system resource_1 110 through the system resource_N 114. A central processing unit (CPU) 200 provides computer instruction, execution, computation, and other capabilities within the recovery device 102. A display 202 provides visual information to a user of the recovery device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they are optional components for the recovery device 102. Accordingly, the recovery device 102 may operate as a completely automated embedded device without user feedback or configurability. However, the recovery device 102 may also provide user feedback and configurability via the display 202 and the input device 204, respectively.

A communication module 206 provides interconnection capabilities that allow the recovery device 102 to communicate with other modules within the system 100, such as the processing device 106. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 includes any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may also include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a recovery control application 210 that operates in conjunction with a recovery module 212 to perform the automated resource integrity during partial backout of application updates associated with the present subject matter. It should be noted that the recovery control application 210 may also form a portion of the recovery module 212 or conversely without departure from the scope of the present subject matter.

The recovery control application 210 includes instructions executable by the CPU 200 for performing these functions. The CPU 200 executes these instructions to provide the processing capabilities described above and in more detail below for the recovery device 102. The recovery control application 210 may form a portion of an interrupt service routine (ISR), a portion of an operating system, a portion of a browser application, or a portion of a separate application without departure from the scope of the present subject matter. The recovery control application 210 may also create, store, select, and process recovery log records in association with the recovery log record storage area 116.

The recovery module 212 provides processing capabilities for the automated resource integrity during partial backout of application updates. Though the recovery module 212 is illustrated as a component-level module for ease of illustration and description purposes, it should be noted that the recovery module 212 includes any hardware, programmed processor(s), and memory used to carry out the functions of the recovery module 212 as described above and in more detail below. For example, the recovery module 212 may include additional controller circuitry in the form of application specific integrated circuits (ASICs), processors, antennas, and/or discrete integrated circuits and components for performing communication and electrical control activities associated with the recovery module 212. Additionally, the recovery module 212 may also include interrupt-level, stack-level, and application-level modules as appropriate. Furthermore, the recovery module 212 may include any memory components used for storage, execution, and data processing for performing processing activities associated with the recovery module 212. The recovery module 212 may also form a portion of other circuitry described without departure from the scope of the present subject matter.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

The CPU 200, the display 202, the input device 204, the communication module 206, the memory 208, the recovery module 212, and the database 118 are interconnected via an interconnection 214. The interconnection 214 may include a system bus, a network, or any other interconnection capable of providing the respective components with suitable interconnection for the respective purpose.

While the recovery device 102 is illustrated with and has certain components described, other modules and components may be associated with the recovery device 102 without departure from the scope of the present subject matter. Additionally, it should be noted that, while the recovery device 102 is described as a single device for ease of illustration purposes, the components within the recovery device 102 may be co-located or distributed and interconnected via a network without departure from the scope of the present subject matter. For a distributed arrangement, the display 202 and the input device 204 may be located at a kiosk or other location, while the CPU 200 and memory 208 may be located at a local or remote server. Many other possible arrangements for components of the recovery device 102 are possible and all are considered within the scope of the present subject matter. It should also be understood that, though the recovery log record storage area 116 is shown within the database 118, it may also be stored within the memory 208 without departure from the scope of the present subject matter. Accordingly, the recovery device 102 may take many forms and may be associated with many platforms.

Figure 3:
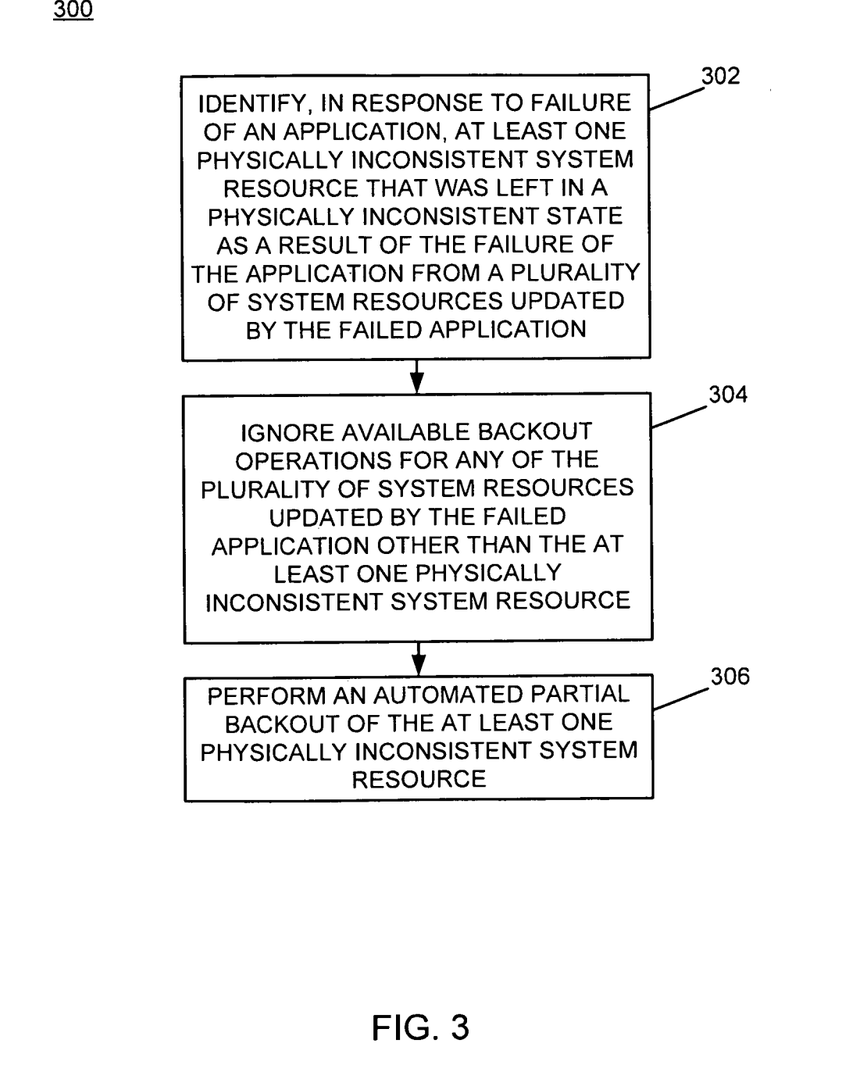
FIG. 3 is a flow chart of an example of an implementation of a process for providing automated resource integrity during partial backout of application updates according to an embodiment of the present subject matter.
Figure 4:
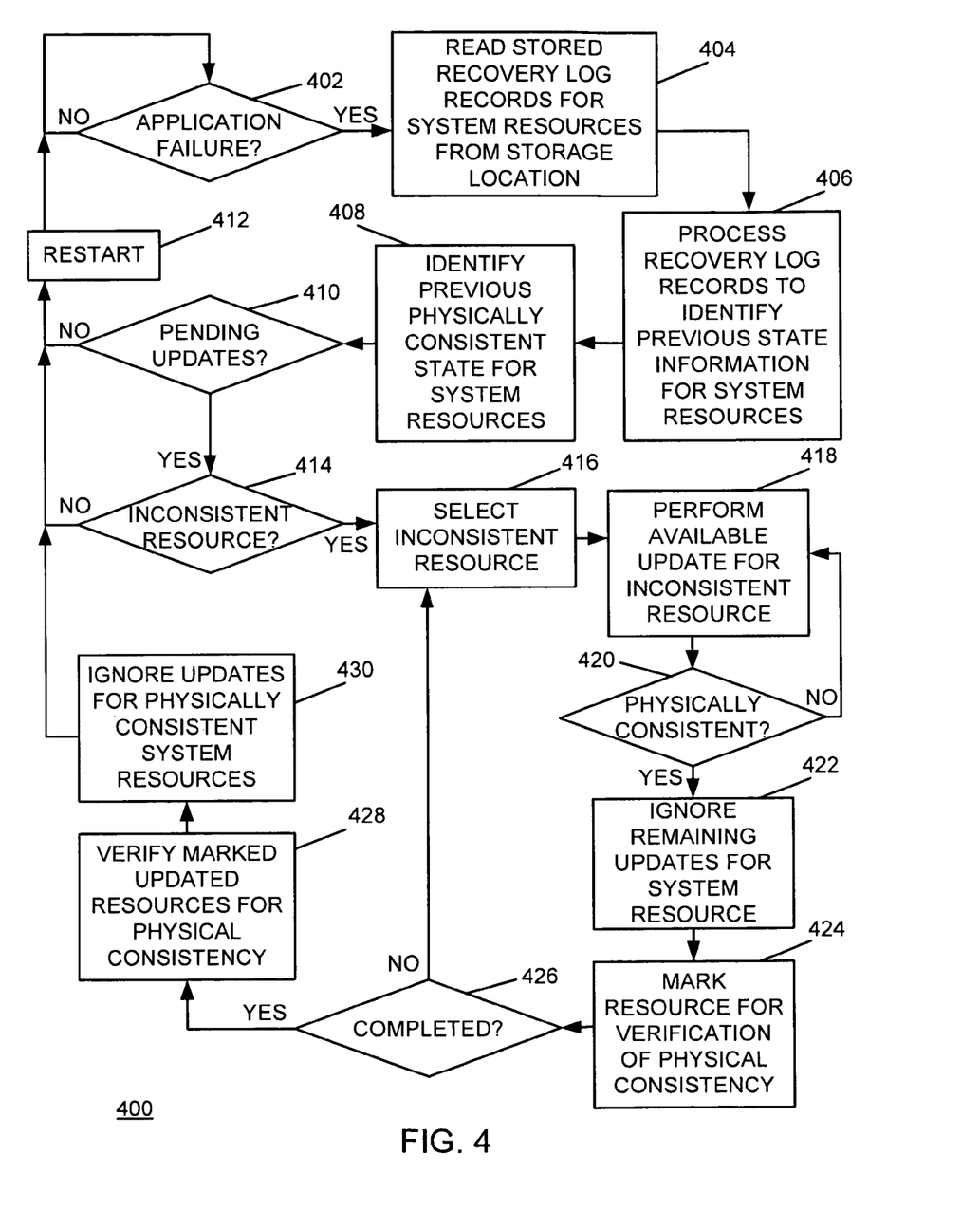
FIG. 4 is a flow chart of an example of an implementation of a process for providing automated resource integrity during partial backout of application updates, verifying system resources that are updated from a physically inconsistent state to a physically consistent state, and ignoring available updates that do not result in physical inconsistency of system resources to expedite restart according to an embodiment of the present subject matter.

FIGS. 3 and 4 below describe example processes that may be executed by recovery devices, such as the recovery device 102, to perform the automated resource integrity during partial backout of application updates associated with the present subject matter. Many other variations on the example processes are possible and all are considered within the scope of the present subject matter. The example processes may be performed by modules, such as the recovery module 212 and/or by the recovery application 210 and executed by the CPU 200. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for providing automated resource integrity during partial backout of application updates. At block 302, the process 300 identifies, in response to failure of an application, at least one physically inconsistent system resource that was left in a physically inconsistent state as a result of the failure of the application from a plurality of system resources updated by the failed application. At block 304, the process 300 ignores available backout operations for any of the plurality of system resources updated by the failed application other than the at least one physically inconsistent system resource. At block 306, the process 300 performs an automated partial backout of the at least one physically inconsistent system resource.

FIG. 4 is a flow chart of an example of an implementation of a process 400 for providing automated resource integrity during partial backout of application updates, verifying system resources that are updated from a physically inconsistent state to a physically consistent state, and ignoring available updates that do not result in physical inconsistency of system resources to expedite restart. The process waits at decision point 402 for an application failure, such as the application 108 that operates upon the system resource_1 110 through the system resource_N 114.

In response to an application failure, at block 404, the process 400 reads stored recovery log records for system resources from a storage location, such as the recovery log record storage area 116 within the database 118. At block 406, the process 400 processes the recovery log records to identify previous state information for system resources, such as the system resource_1 110 through the system resource_N 114.

At block 408, the process 400 identifies a previous physically consistent state for each of the system resources. The previous physically consistent state may be determined from the processing performed on the recovery log records and the associated application updates to the system resources represented within the processed recovery log records. The previous physically consistent state for a given system resource may have resulted from the last committed application update for a given system resource, as reflected in the recovery log records. Alternatively, there may have been many committed updates that occurred after the last physically consistent point. As such, at block 408, the process 400 identifies where in the recovery log records the previous point of physical consistency may be identified.

The previous physically consistent state may also be determined by examination of the respective system resource for integrity of any referenced elements. For example, a system resource may be examined to determine whether all data sources and memory indexes (e.g., pointers, structures, arrays, etc.) reference valid physical memory locations, whether all configuration registers contain valid configuration values, and that each peripheral component associated with a system resource (not shown) is in an appropriate state for restart of the respective system resource and the failed application.

At decision point 410, the process 400 makes a determination as to whether there are any pending updates for any of the system resources. Pending updates are updates that are considered to be "in flight" at the time of failure of the application. These pending updates may or may not affect the physical consistency for a given system resource. For pending updates that will not affect the physical consistency of the system resource, the respective system resource and the associated updates may be ignored to expedite system restart, as described in more detail below.

For pending updates that do affect the physical consistency of the system resource, the given system resource may be considered to be in a physically inconsistent state. In such a situation, the respective system resource is automatically partially backed out by performing available updates to the system resource referenced by the stored recovery log records to bring the physically inconsistent system resource to a physically consistent state. Available updates referenced by the stored recovery log records associated with the physically inconsistent system resource after the physically consistent state is achieved may be ignored to further expedite system restart, as described in more detail below.

When a determination is made at decision point 410 that there are no pending updates for any of the system resources, the process 400 restarts the application and the system resources at block 412 and returns to decision point 402 to await another application failure. When a determination is made at decision point 410 that there are pending updates for any of the system resources, the process 400 makes a determination at decision point 414 as to whether the pending updates result in a physically inconsistent state for any of the system resources. When a determination is made at decision point 414 that none of the pending updates affect physical consistency for any of the system resources, the process 400 ignores the pending updates to expedite restart processing, restarts the application and the system resources at block 412 and returns to decision point 402 to await another application failure. When a determination is made at decision point 414 that failure of the application has resulted in at least one inconsistent system resource, the process 400 selects the inconsistent resource at block 416 for updating.

At block 418, the process 400 performs an available update for the inconsistent system resource. The available update may be the oldest available update referenced by stored recovery log records as previously performed (e.g., in flight) by the failed application to initiate bringing the physically inconsistent system resource to a physically consistent state.

It should be noted that there may be more than one available update to bring the physically inconsistent system resource to a physically consistent state, as described in more detail below. As such, at decision point 420, the process 400 makes a determination as to whether the system resource is physically consistent based upon the performed update operation. When a determination is made that the resource is not yet physically consistent, the process 400 returns to block 418 to perform the next available update. When a determination is made that the resource is physically consistent, whether after one or more update operations, the process 400 ignores any remaining available updates to expedite system restart at block 422. At block 424, the process marks the updated system resource for verification.

At decision point 426, the process 400 makes a determination as to whether operations on physically inconsistent system resources have been completed to update all of the system resources to a physically consistent state. When a determination is made that the updating process is not completed, the process 400 returns to block 416 to select the next physically inconsistent resource and continues processing as described above.

When a determination is made at decision point 426 that the updating process is completed, the process 400 verifies, at block 428, the physical integrity any partially backed out system resources that have been marked for verification. The verification of the physical integrity of any partially backed out system resources may include, for example, verifying that each memory index operator associated with the any partially backed out system resource references a valid storage location within a memory, that each memory storage location referenced by any partially backed out system resource is accessible, that each configuration register value associated with any partially backed out system resource represents a valid configuration value, or that each peripheral component associated with any partially backed out system resource is in an appropriate state for startup of the respective partially backed out system resource. Many other possibilities exist for verification of system resources that have been partially backed out and all are considered within the scope of the present subject matter.

As described above, any updates to any system resources that were determined not to result in a physically inconsistent state for the given resource as a result of the application failure are ignored at block 430 to further expedite system restart. The process 400 restarts the application and the system resources at block 412 and returns to decision point 402 to await another application failure.

As described above in association with FIGS. 1 through 4, the example systems and processes provide automated resource integrity during partial backout of application updates, and verification of system resources that are updated from a physically inconsistent state to a physically consistent state, and ignore available updates that do not result in physical inconsistency of the respective system resources to expedite restart. Many other variations and additional activities associated with automated resource integrity during partial backout are possible and all are considered within the scope of the present subject matter.

Those skilled in the art will recognize, upon consideration of the above teachings, that certain of the above examples are based upon use of a programmed processor such as CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
   identifying, in response to failure of an application that updated a plurality of system resources, at least one physically inconsistent operational system resource that was left in a physically inconsistent data access state as a result of the failure of the application from the plurality of system resources updated by the failed application;
   ignoring available update operations for any of the plurality of system resources updated by the failed application other than the at least one physically inconsistent operational system resource that was left in the physically inconsistent data access state; and
   performing an automated partial backout of the at least one physically inconsistent operational system resource to bring the at least one physically inconsistent operational system resource to a physically consistent data access state comprising:
      performing available updates to the at least one physically inconsistent operational system resource to bring the at least one physically inconsistent operational system resource to the physically consistent data access state as a physically consistent operational system resource; and
      ignoring any remaining available updates for the physically consistent operational system resource after the physically consistent data access state is achieved to expedite system restart.

2. The method of claim 1, where identifying, in response to the failure of the application that updated the plurality of system resources, the at least one physically inconsistent operational system resource that was left in the physically inconsistent data access state as the result of the failure of the application comprises:
   identifying a previous state of physical data access consistency for each of the plurality of system resources based at least upon stored recovery log records associated with each of the plurality of system resources;
   determining, for each of the plurality of system resources, whether any pending application update operations are indicated by the stored recovery log records at the time of the failure of the application; and
   selecting the at least one physically inconsistent operational system resource based upon a determination that at least one pending application update operation caused the physically inconsistent data access state for the at least one physically inconsistent operational system resource.

3. The method of claim 1, where performing the available updates to the at least one physically inconsistent operational system resource to bring the at least one physically inconsistent operational system resource to the physically consistent data access state as the physically consistent operational system resource comprises performing the available updates to the at least one physically inconsistent operational system resource referenced by stored recovery log records as previously initiated by the failed application to bring the at least one physically inconsistent operational system resource to the physically consistent data access state as the physically consistent operational system resource.

4. The method of claim 3, where ignoring any remaining available updates for the physically consistent operational system resource after the physically consistent data access state is achieved comprises ignoring the available updates referenced by the stored recovery log records associated with the physically consistent operational system resource after the physically consistent data access state is achieved.

5. The method of claim 1, further comprising marking the at least one partially backed out operational system resource for verification.

6. The method of claim 5, further comprising verifying physical integrity of the at least one partially backed out operational system resource prior to restart of the at least one partially backed out operational system resource.

7. The method of claim 6, where verifying the physical integrity of the at least one partially backed out operational system resource comprises verifying, for the at least one partially backed out operational resource, that at least one of:
each memory index operator associated with the at least one partially backed out operational system resource references a valid storage location within a memory;
each memory storage location referenced by the at least one partially backed out operational system resource is accessible;
each configuration register value associated with the at least one partially backed out operational system resource represents a valid configuration value; and
each peripheral component associated with the at least one partially backed out operational system resource is in an appropriate state for startup of the at least one partially backed out operational system resource.

8. The method of claim 1, further comprising verifying physical integrity of any of the plurality of system resources other than the at least one physically inconsistent operational system resource prior to restart.

9. A system, comprising:
a memory adapted to store resource recovery information; and
a processor programmed to:
identify, in response to failure of an application that updated a plurality of system resources, at least one physically inconsistent operational system resource that was left in a physically inconsistent data access state as a result of the failure of the application from the plurality of system resources updated by the failed application based upon the stored resource recovery information;
ignore available update operations for any of the plurality of system resources updated by the failed application other than the at least one physically inconsistent operational system resource that was left in the physically inconsistent data access state; and
perform an automated partial backout of the at least one physically inconsistent operational system resource to bring the at least one physically inconsistent operational system resource to a physically consistent data access state, where the processor is programmed to:
perform available updates to the at least one physically inconsistent operational system resource to bring the at least one physically inconsistent operational system resource to the physically consistent data access state as a physically consistent operational system resource; and
ignore any remaining available updates for the physically consistent operational system resource after the physically consistent data access state is achieved to expedite system restart.

10. The system of claim 9, where, in being programmed to identify, in response to the failure of the application that updated the plurality of system resources, the at least one physically inconsistent operational system resource that was left in the physically inconsistent data access state as the result of the failure of the application, the processor is programmed to:
identify a previous state of physical data access consistency for each of the plurality of system resources based at least upon stored recovery log records associated with each of the plurality of system resources;
determine, for each of the plurality of system resources, whether any pending application update operations are indicated by the stored recovery log records at the time of failure of the application; and
select the at least one physically inconsistent operational system resource based upon a determination that at least one pending application update operation caused the physically inconsistent data access state for the at least one physically inconsistent operational system resource.

11. The system of claim 9, where, in being programmed to perform the available updates to the at least one physically inconsistent operational system resource to bring the at least one physically inconsistent operational system resource to the physically consistent data access state as the physically consistent operational system resource, the processor is programmed to perform the available updates to the at least one physically inconsistent operational system resource referenced by stored recovery log records as previously initiated by the failed application to bring the at least one physically inconsistent operational system resource to the physically consistent data access state as the physically consistent operational system resource.

12. The system of claim 11, where, in being programmed to ignore any remaining available updates for the physically consistent operational system resource after the physically consistent data access state is achieved, the processor is programmed to ignore the available updates referenced by the stored recovery log records associated with the physically consistent operational system resource after the physically consistent data access state is achieved.

13. The system of claim 9, where the processor is further programmed to mark the at least one partially backed out operational system resource for verification.

14. The system of claim 13, where the processor is further programmed to verify physical integrity of the at least one partially backed out operational system resource prior to restart of the at least one partially backed out operational system resource.

15. The system of claim 14, where, in being programmed to verify the physical integrity of the at least one partially backed out operational system resource, the processor is programmed to verify, for the at least one partially backed out operational system resource, that at least one of:
each memory index operator associated with the at least one partially backed out operational system resource references a valid storage location within a memory associated with the at least one partially backed out operational system resource;

each memory storage location referenced by the at least one partially backed out operational system resource is accessible;

each configuration register value associated with the at least one partially backed out operational system resource represents a valid configuration value; and each peripheral component associated with the at least one partially backed out operational system resource is in an appropriate state for startup of the at least one partially backed out operational system resource.

16. The system of claim 9, where the processor is further programmed to verify physical integrity of any of the plurality of system resources other than the at least one physically inconsistent operational system resource prior to restart.

17. A system, comprising:
a memory adapted to store recovery log records for a plurality of system resources; and
a processor programmed to:
retrieve, in response to failure of an application that updated the plurality of system resources, the recovery log records from the memory;
identify at least one physically inconsistent operational system resource that was left in a physically inconsistent data access state as a result of the failure of the application from the plurality of system resources updated by the failed application based upon the retrieved recovery log records;
ignore available update operations for any of the plurality of system resources updated by the failed application other than the at least one physically inconsistent operational system resource that was left in the physically inconsistent data access state;
perform an automated partial backout of the at least one physically inconsistent operational system resource by performing available updates to the at least one physically inconsistent operational system resource referenced by the retrieved recovery log records as previously initiated by the failed application to bring the at least one physically inconsistent operational system resource to a physically consistent data access state, where the processor is programmed to:
perform available updates to the at least one physically inconsistent operational system resource to bring the at least one physically inconsistent operational system resource to the physically consistent data access state as a physically consistent operational system resource; and;
ignore any remaining available updates referenced by the retrieved recovery log records associated with the physically consistent operational system resource after the physically consistent state is achieved to expedite system restart;
mark the at least one partially backed out operational system resource for verification;
verify physical integrity of the at least one partially backed out operational system resource prior to restart of the at least one partially backed out operational system resource; and
restart at least one of the application and the plurality of system resources.

18. A computer program product comprising a computer useable storage medium including a computer readable program, where the computer readable program when executed on a computer causes the computer to:

identify, in response to failure of an application that updated a plurality of system resources, at least one physically inconsistent operational system resource that was left in a physically inconsistent data access state as a result of the failure of the application from the plurality of system resources updated by the failed application;

ignore available update operations for any of the plurality of system resources updated by the failed application other than the at least one physically inconsistent operational system resource that was left in the physically inconsistent data access state; and perform an automated partial backout of the at least one physically inconsistent operational system resource to bring the at least one physically inconsistent operational system resource to a physically consistent data access state, where the computer readable program when executed on a computer causes the computer to:
perform available updates to the at least one physically inconsistent operational system resource to bring the at least one physically inconsistent operational system resource to the physically consistent data access state as a physically consistent operational system resource; and
ignore any remaining available updates for the physically consistent operational system resource after the physically consistent data access state is achieved to expedite system restart.

19. The computer program product of claim 18, where, in causing the computer to identify, in response to the failure of the application that updated the plurality of system resources, the at least one physically inconsistent operational system resource that was left in the physically inconsistent data access state as the result of the failure of the application, the computer readable program when executed on the computer causes the computer to:
identify a previous state of physical data access consistency for each of the plurality of system resources based at least upon stored recovery log records associated with each of the plurality of system resources;
determine, for each of the plurality of system resources, whether any pending application update operations are indicated by the stored recovery log records at the time of failure of the application; and
select the at least one physically inconsistent operational system resource based upon a determination that at least one pending application update operation caused the physically inconsistent data access state for the at least one physically inconsistent operational system resource.

20. The computer program product of claim 18, where, in causing the computer to perform the available updates to the at least one physically inconsistent operational system resource to bring the at least one physically inconsistent operational system resource to the physically consistent data access state as the physically consistent operational system resource, the computer readable program when executed on the computer causes the computer to perform the available updates to the at least one physically inconsistent operational system resource referenced by stored recovery log records as previously initiated by the failed application to bring the at least one physically inconsistent operational system resource to the physically consistent data access state as the physically consistent operational system resource.

21. The computer program product of claim 20, where, in causing the computer to ignore any remaining available updates for the physically consistent operational system resource after the physically consistent data access state is achieved, the computer readable program when executed on the computer causes the computer to ignore the available updates referenced by the stored recovery log records associated with the physically consistent operational system resource after the physically consistent data access state is achieved.

22. The computer program product of claim 18, where the computer readable program when executed on the computer further causes the computer to mark the at least one partially backed out operational system resource for verification.

23. The computer program product of claim 22, where the computer readable program when executed on the computer further causes the computer to verify physical integrity of the at least one partially backed out operational system resource prior to restart of the at least one partially backed out operational system resource.

24. The computer program product of claim 23, where, in causing the computer to verify the physical integrity of the at least one partially backed out operational system resource, the computer readable program when executed on the computer causes the computer to verify, for the at least one partially backed out operational system resource, that at least one of:

each memory index operator associated with the at least one partially backed out operational system resource references a valid storage location within a memory associated with the at least one partially backed out operational system resource;

each memory storage location referenced by the at least one partially backed out operational system resource is accessible;

each configuration register value associated with the at least one partially backed out operational system resource represents a valid configuration value; and each peripheral component associated with the at least one partially backed out operational system resource is in an appropriate state for startup of the at least one partially backed out operational system resource.

25. The computer program product of claim 18, where the computer readable program when executed on the computer further causes the computer to verify physical integrity of any of the plurality of system resources other than the at least one physically inconsistent operational system resource prior to restart.

\* \* \* \* \*